Jan. 22, 1957  J. F. KERNS  2,778,291
ROTARY RENOVATOR
Filed Oct. 19, 1954  3 Sheets-Sheet 1

Inventor
James F. Kerns

Jan. 22, 1957    J. F. KERNS    2,778,291
ROTARY RENOVATOR
Filed Oct. 19, 1954    3 Sheets-Sheet 2
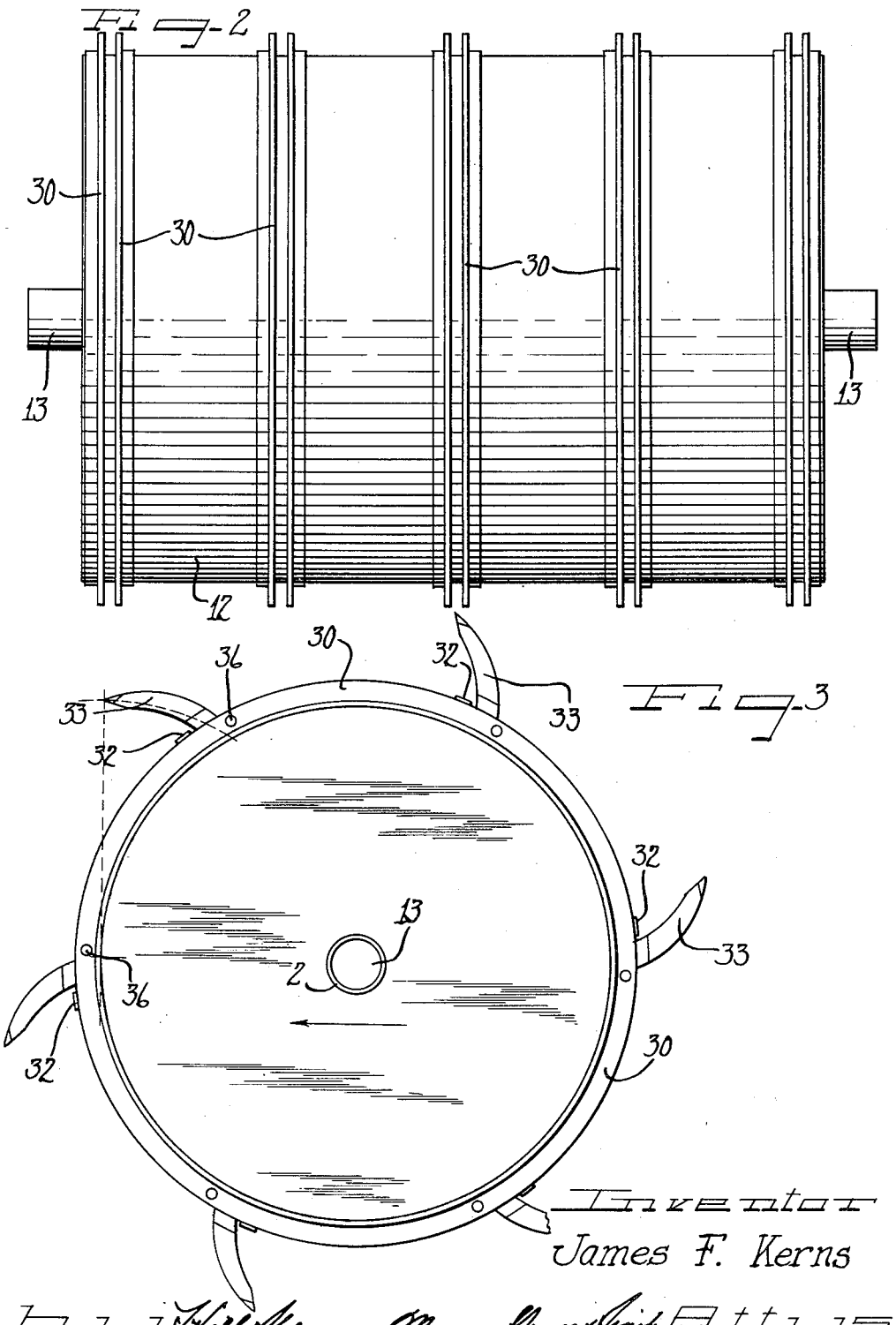

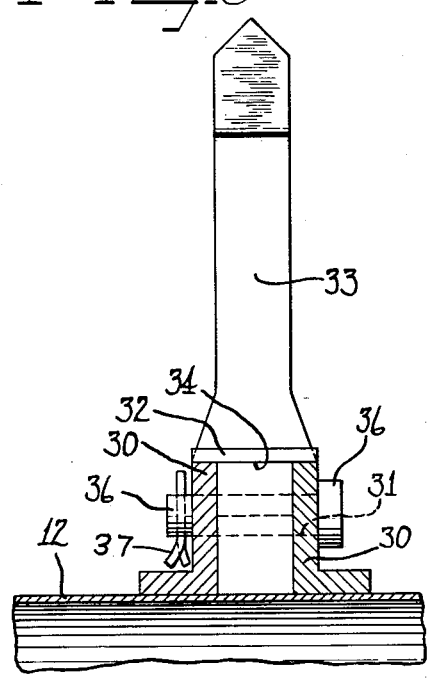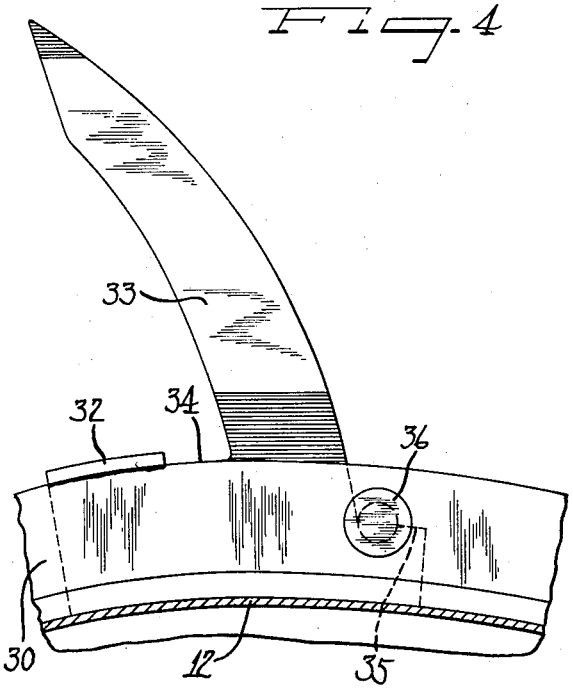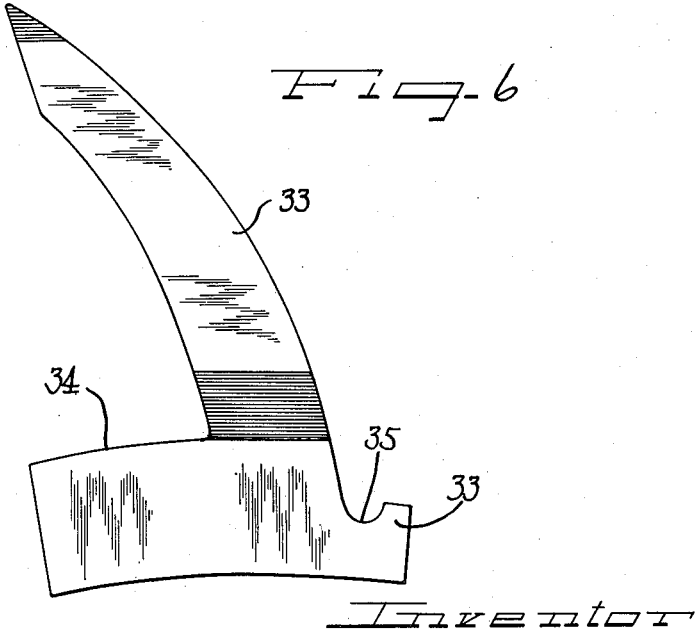

United States Patent Office 2,778,291
Patented Jan. 22, 1957

2,778,291

ROTARY RENOVATOR

James F. Kerns, Sheridan, Wyo.

Application October 19, 1954, Serial No. 463,099

2 Claims. (Cl. 97—52)

The present invention relates to apparatus for soil treatment and is, more particularly, concerned with the construction of an improved apparatus for aerating sod-bound soil as well as correcting other soil conditions in which the surface is to a substantial extent impenetrable by fertilizer or other soil conditioning agents.

The problem of soil conditioning is, of course, an age old one and I am well aware of the fact that numerous machines have been constructed in the past for the purpose of treating the surface of sod-bound land or the like. However, to my knowledge, such prior art machines have been unsatisfactory for continued heavy duty use at reasonable cost. This will be appreciated when it is understood that the prior art soil renovators, operate to drive a piercing tool into the surface of the soil for purposes of admitting air, fertilizer and/or moisture to the soil below the grass roots. In view of the very great abrasive nature of soil, and especially soil containing sand and gravel, the soil piercing teeth wear out at a relatively rapid pace and are also occasionally broken by hard objects embedded in the soil. According to the principles of the present invention, an improved renovator is provided in which the soil piercing teeth may be replaced in a matter of seconds when necessary. This not only permits the replacement of worn or broken teeth, but also provides a means whereby the individual teeth may be removed from the body of the machine for convenient sharpening or other similar treatment.

Further, by means of the present invention, a connection between the soil piercing teeth and the main body of the renovator is substantially rigidified over prior art structures and improved loading characteristics on the teeth are achieved.

Coupled with the greatly improved soil piercing tooth and mounting assembly, a novel and important improvement is provided in the form of a retractable wheeled undercarriage for the renovator. It is, of course, extremely difficult to transport a renovator of the prior art construction wherein the only means of transporting the renovator body, with its projecting piercing teeth, is to draw the renovator over the road, with great hardship to the renovator, as well as the road, or to lift the renovator off the ground and transport it by means of a trailer or similar device. Needless to say, such maneuvers are undesirable and consequently renovating equipment of the prior art was rarely considered portable from job to job and ordinarily was left standing out in the elements to prevent damage to roadways and building floors.

According to the present invention, a renovator is provided in which a pair of supporting wheels are rotatably mounted on pivotal levers actuatable into a supporting, or retracted position. Through the use of a duel linkage arrangement and a single fluid motor, the instant renovating apparatus may be transported over presently existing roadways or the like without danger of injury either to the renovator or to the road by contact with the renovator soil piercing teeth. Further, in view of the ready portability of the instant renovator machine and hence the ease with which it may be stored out of the elements, fertilizer spreading equipment, as well as seeding apparatus, may be provided for depositing fertilizer or seed directly into the apertures formed in the soil by the soil piercing teeth.

It is, therefore, an object of the present invention to provide a novel soil renovator having readily replaceable and unusually strong soil-piercing teeth and mounting structure.

A further object of the present invention is to provide a novel retractable undercarriage for a soil renovator whereby the renovator may be transported from place to place without endangering the soil-engaging renovator teeth.

Yet another object of the present invention is to provide a superior mounting construction for renovator soil-piercing teeth whereby stresses applied by said teeth to the renovator drum supporting them are peripherally applied without danger to the tooth supports.

Still a further object of the present invention is to provide a simplified renovator soil piercing tooth capable of simple and extremely rapid assembly to a renovator drum.

A feature of the invention resides in the construction of a renovator drum having at least a pair of peripherally extending channel walls between which renovator teeth are positioned and through which the forces applied to said renovator tooth may be dissipated without damage to the drum supporting the channels.

Still a further feature of the present invention is a retractable undercarriage for renovators or the like.

Yet another object of the present invention resides in the provision of a combined portable rotary soil renovator and fertilizer spreader.

Still other and further objects and features of the present invention will at once become apparent to those skilled in the art from a consideration of the attached sheets of drawings wherein a preferred embodiment of the present invention is shown by way of illustration only and, wherein:

Figure 2 is a side elevational view of the renovator drum constructed according to the present invention;

Figure 3 is an end elevational view of the rotary renovator drum illustrating the positioning of renovator teeth thereon;

Figure 4 is an enlarged, partially broken away, drawing illustrating the construction of applicant's novel renovator tooth and mounting;

Figure 5 is an end elevational view of applicant's novel renovator tooth as viewed from the left in Figure 4; and Figure 6 is a still further enlarged side elevational view of applicant's novel renovator tooth per se.

As shown on the drawings:

Figure 1:
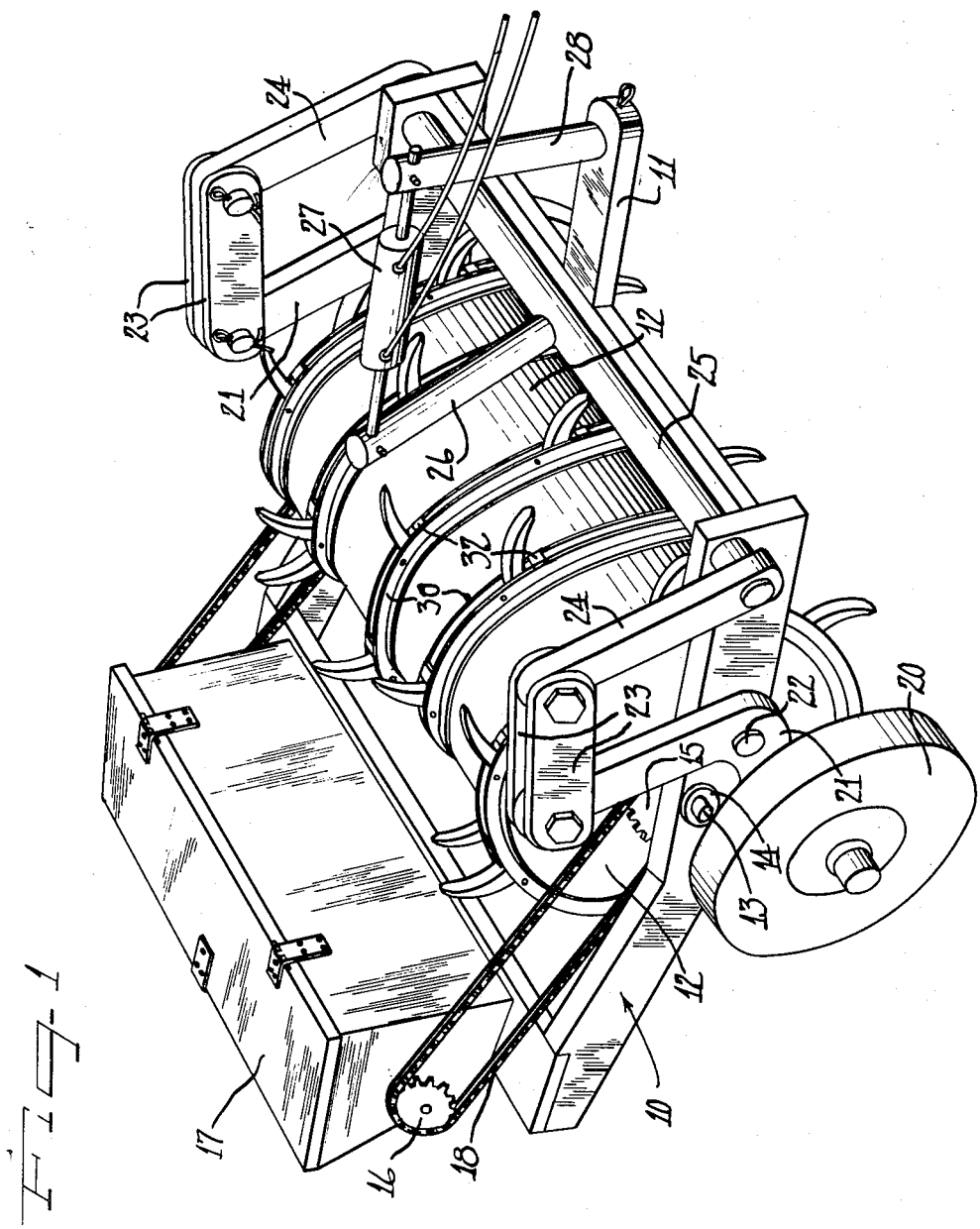
Figure 1 is an isometric view of applicant's combined soil renovator and fertilizer spreader.

As may be seen from consideration of Figure 1, the combined renovator and fertilizer distributing machine of the present invention comprises generally a frame 10 having a draw bar 11 for connection with conventional pulling means such as a tractor. Approximately intermediate the ends of the frame 10, a drum 12 is fixedly mounted on axle 13 which is in turn rotatably mounted in the bearing 14 in the frame 10. The drum is provided with a sprocket wheel 15 at each end of the axle shaft 13 for driving connection with sprockets 16 associated with the material spreading apparatus 17 through a conventional chain 18. As a result of this connection, any rotation of the drum 12 will cause a corresponding operation of the distributing apparatus 17.

A pair of wheels 20 are provided for transporting the renovator from place to place without damage to the renovator teeth. The wheels 20 are rotatably mounted on the retractable lever 21 pivoted at 22 to the frame 10. The lever 21 is in turn actuated about the pivot 22 by means of links 23 connected to crank arms 24 secured for movement with actuation shaft 25. The shaft 25 is rotated by means of the crank arm 26 which is urged in opposite directions by means of the hydraulic motor 27 connected to the draw bar 11 through a fixed post 28. As will be apparent, actuation of the hydraulic motor 27 will cause the levers 21 supporting the wheels 20 to rock about the pivots 22 into either a raised, retracted, position in which the renovating drum 12 rest on the ground and the wheels are out of contact therewith, or a transporting position in which the wheels 20 are in contact with the ground and the drum 12 is raised well above the ground surface. It will be understood that although the motor 27 is shown secured to an upstanding post 28 on the draw bar 11, the motor may, if desired, be directly connected to the draw bar 11 in situations where the draw bar is sufficiently long to provide a satisfactory component of force in the generally horizontal direction to thereby satisfactorily actuate the wheels. Substantial torque requirements are imposed on the hydraulic motor 27 and its associated linkage as a result of the relatively heavy weight of the apparatus as a whole and connection of the power motor directly to the draw bar 11 provides a somewhat more rigid construction, especially where large and heavy renovators are concerned.

The renovator itself comprises, as indicated above, a drum 12 mounted for rotation relative to the frame 10. The peripheral surface of the drum is preferably provided with a plurality of rows of upstanding channel walls 30. The walls 30 are secured to the surface of the drum by means of welding or bolts and provide efficient rigidification of the drum during operation of the device. Each of the channels formed by the walls 30 cooperates with a plurality of soil piercing teeth, as may be more clearly shown in the Figures 2 through 6. As may be seen, the channel walls 30 are provided with peripherally spaced locking pin apertures. Immediately adjacent the aperture and on the side of the tooth opposite the direction of rotation a blocking platform 32 is rigidly secured, preferably by welding, across the channel formed by the walls 30. Each soil piercing tooth 33 is provided with an extension shoulder 34 which may be slid under the bearing platform 32 between the channel walls 30. The rear of the tooth is provided with a transverse recess 35 which, as may be seen from Figure 4, cooperates with a locking pin 36 to retain the tooth in position beneath the bearing plate 32. A conventional cotter key or similar fastening device 37 is provided through one end of the locking pin 36 to permit its ready removal from the apertures 31.

It will be readily apparent that each of the teeth 33 may be rapidly installed in position beneath the bearing platform 32, merely by sliding the base of the tooth underneath the platform 32 and passing the locking pin 36 through the apertures 31. This connection, while extremely simple, is unusually effective in properly distributing the forces applied to the renovator teeth. Thus, in operation when the renovator drum 12 rests on the ground and is proceeding toward the left as viewed in Figure 3, there is a strong tendency for the teeth to pull away from the drum 12, upon removal of the tooth from the ground. This tearing away is prevented by the plate or platform 32 which applies the force directly to the one piece peripheral channel walls 30 in a radially outwardly direction. The forces applied to the platform 32 are therefore evenly distributed throughout the peripheral channel walls 30, preventing the application of a localized force directly to the surface of the drum 12. As the forces are applied to the piercing teeth, tending to apply radially outwardly directed force against the platform 32, a radially inwardly directed force is simultaneously applied adjacent the effective pivot point of the tooth beneath the pin 36. Ordinarily the radially inwardly directed application of force causes no injury to the drum but it will be understood that in cases of extremely heavy duty use, the present invention includes within its scope, the provision of a solid base for the tooth 33 with an aperture therethrough instead of the notch 35. With such an arrangement, the tooth would apply the inwardly directed force directly to the pin 36 and hence to the peripheral channel walls 30 rather than directly to the drum, thereby providing a more rigid tooth-to-drum connection.

In operation, the rotary renovator of the present invention is transported to the location of the soil to be conditioned by means of a tractor or other device which is secured to the draw bar 11. In such transportation, the power motor 27 is actuated to rotate the lever arm 24 in the counterclockwise direction thereby causing a rotation of the lever 21 in a counterclockwise direction to lower the wheels 20 relative to the frame 10. After arriving at the location of the soil to be conditioned, the motor 27 is reversed in operation and the lever 21 rotated in the reverse clockwise direction to lift the wheels 20 relative to the frame 10, thereby causing the drum 12 to drop down onto the ground. Subsequent to this operation, the frame 10 is drawn over the ground by means of the draw bar 11 and the teeth 33 pierce the top surface of the soil, thereby causing the drum to rotate as the frame 10 progresses.

As may be seen from a consideration of Figures 2, 4 and 6, the teeth 33 are provided with a curvature which permits the individual tooth to pierce the ground substantially perpendicularly to the surface thereof. However, when the tooth is withdrawn from the ground upon rotation of the drum thereover, a wedge-shaped piece of earth is removed, leaving a deep hole in the surface of the ground. By means of this curved construction, a maximum depth of tooth penetration into the soil is achieved since the maximum resistance offered by the teeth is in the removal of the tooth from the ground rather than in the penetration into the ground. Actually, as a result of the curved shape, the teeth tend to hold the drum into direct contact with the ground and by staggering the angular position of the teeth in adjacent rows or channels, the tendency of each tooth to resist withdrawal from the ground will cause the next succeeding tooth to be positively forced into the ground under a force in excess of the mere weight of the drum 12. Accordingly, a lighter renovator structure may be used with very satisfactory penetration.

As noted above it is desired that the curvature of the teeth preferably be such that they will pierce the ground perpendicularly thereto. Accordingly in the preferred embodiment as shown in Figure 3, each of the teeth 33 is curved along a radius substantially equal to the radius of the drum 12 and originating from a point on the surface of the drum. Likewise, the teeth preferably project outwardly from the surface of the drum substantially to a line drawn tangent to the surface of the drum at the point of origination of the radius of curvature above mentioned.

Immediately behind the drum, the distribution apparatus 17 drops fertilizer, seed, or other material, onto the pierced ground. As a result of the piercing step, this fertilizer or other material is permitted to pierce through the top layer of ground, which may be otherwise sodbound, to feed the roots of the grass in an effective manner. Further, since the rotary actuating element 16 of the distributing apparatus 17 is directly driven from the renovator drum 12 by the chain 18, it is possible to synchronize the distributing apparatus with the drum to thereby permit the distribution of fertilizer or other material directly into the hole made by each piercing tooth. For example, a rotating drum could be positioned within the structure 17 having peripheral apertures of a number equal to the teeth 33. The peripheral apertures would be positioned in rows, similar to the rows of channels 30, and would lie directly over the aperture in the bottom of the distributing apparatus, there being one such aperture for each row of teeth on the drum 12. With rotation of the material-containing drum, material would be passed through the bottom apertures whenever one of the rotating drum apertures came in alignment therewith. Since the rotating drum secured to the drive element 16 is in synchronism with the drum 12, it is possible to deposit fertilizer or the like directly into the pierced apertures immediately after the piercing operation.

It will thus be apparent that I have provided a novel rotary soil renovator having a simplified and greatly rigidified construction capable of simple disassembly for repair, tooth grinding, or other purpose such as annual cleaning, etc. and which is capable of transportation from place to place without additional specialized transportating equipment.

It will be understood, further, that variations and modifications may be made in the above described construction without departing from the scope of the novel concepts of the present invention and accordingly, I do not intend to limit the scope of the present invention other than is required by the appended claims.

I claim as my invention:

1. A rotary soil renovator comprising a drum rotatably mounted on a frame, means for drawing said frame across the surface of ground to be renovated, and a plurality of soil piercing teeth connected to said drum on the periphery thereof, each said tooth having a base portion positioned between a pair of peripheral channel walls secured to and extending completely around said drum, said base portion extending in the direction of rotation of said drum for retention under a bearing platform secured to and bridging said channel walls, and separable means for positively preventing undesired separation of said tooth from said channel.

2. A renovator for piercing the top surface of sod-bound soil or the like comprising a drum, means for rolling said drum over the surface of said soil, a plurality of piercing teeth projecting generally radially from said drum for piercing the surface of said soil and means for separably connecting each of said teeth to said drum, said means comprising a pair of axially spaced circumferential channel walls secured to and extending completely around said drum, a bearing plate extending axially across said channel walls and secured thereto, a base on each said tooth for projection under said plate, and removable locking means passing through said channel walls and interlocking with said base for preventing inadvertent separation of said base from under said platform whereby each of said teeth is rigidly secured on said drum.

References Cited in the file of this patent

UNITED STATES PATENTS

| | | |
|---|---|---|
| 335,966 | Shaw | Feb. 9, 1886 |
| 491,887 | Hoffman | Feb. 14, 1893 |
| 1,057,472 | Wiley | Apr. 1, 1913 |
| 1,225,423 | Fonnesbeck | May 8, 1917 |
| 1,543,515 | Pickard | June 23, 1925 |
| 1,932,758 | Vega y Vega | Oct. 31, 1933 |
| 2,176,984 | Adkinson | Oct. 24, 1939 |
| 2,206,349 | Finley | July 2, 1940 |
| 2,418,937 | Hyland et al. | Apr. 15, 1947 |
| 2,585,117 | Gurries | Feb. 12, 1952 |